United States Patent Office 2,944,078
Patented July 5, 1960

2,944,078

DERIVATIVES OF DIBENZO CYCLOHEPTADIENE AND A PROCESS OF PREPARING SAME

Bruno Vaterlaus, Basel, Switzerland, and André Furlenmeier, La Courneuve, France, assignors to UCLAF, Paris, France, a French body No Drawing. Filed June 24, 1958, Ser. No. 744,069

Claims priority, application France Aug. 7, 1957

9 Claims. (Cl. 260—470)

The present invention relates to derivatives of dibenzo cycloheptadiene and, more particularly, to derivatives of 12,13,14 - trimethoxy-4,5-6,7-dibenzo cycloheptadiene-8-carboxylic acid and to a process of preparing the same.

It is one object of the present invention to provide such valuable derivatives of 12,13,14-trimethoxy-4,5-6,7-dibenzo cycloheptadiene-8-carboxylic acid, said compounds being useful in the agricultural and industrial field.

Another object of the present invention is to provide a simple and efficient process of preparing such dibenzo cycloheptadiene compounds.

Other objects of the present invention and advantageous features thereof will become apparent as the description proceeds.

In principle, the present invention relates to new dibenzo cycloheptadiene carboxylic acid compounds of the Formula I (I)

wherein
$R_1$ represents hydrogen or a methyl mercapto radical, while
$R_2$ represents hydrogen or a methyl radical.

Such compounds are obtained by subjecting N-desacetyl thiocolchicine of Formula II given hereinafter to the action of methyl iodine to produce N-desacetyl-N,N-dimethyl thiocolchicine of Formula III given hereinafter, quaternizing the tertiary amino group by means of methyl iodide to form the iodo methylate of N-desacetyl-N,N-dimethyl thiocolchicine of Formula IV given hereinafter and subjecting said quaternary ammonium compound to the action of silver oxide. Thereby, the methyl ester of 12,13,14-trimethoxy-9-methyl thio-4,5,6,7-dibenzo cycloheptadiene-8-carboxylic acid of Formula V given hereinafter is obtained. The 9-methyl thio group is then split off by treatment with Raney nickel to yield the methyl ester of 12,13,14-trimethoxy-4,5-6,7-dibenzo cycloheptadiene-8-carboxylic acid of Formula VI given hereinafter which may be saponified to the corresponding acid VI by means of a base in an alcoholic medium.

The reactions taking place thereby may be illustrated by the following equations:

(II)

(III)

(IV)

(V)

(VI) R=—CH$_3$
(VII) R=H

According to a preferred embodiment of the present invention, N-desacetyl thiacolchicine is treated with methyl iodide in methanol at about room temperature in the presence of sodium carbonate. N-desacetyl-N-monomethyl thiocolchicine formed as by-product is separarated by subjecting the crude reaction product to the action of acetic anhydride in the presence of pyridine and extraction with about 6 N sulfuric acid. In this manner the nonacetylated N,N-dimethyl compound is obtained in a substantially pure state.

According to another preferred embodiment, the 9-methyl thio group is split off by hydrogenation in ethyl acetate in the presence of Raney nickel. Saponification of the methyl ester of 12,13,14-trimethoxy-4,5,6,7-dibenzo cycloheptadiene-8-carboxylic acid is carried out in an aqueous solution of sodium hydroxide containing 50% of alcohol.

The new compounds are used in the agricultural and industrial field for the same purpose for which colchicine is used. They are also important intermediates in the synthesis of valuable compounds. They are particularly useful for the modification of kariokynesis and the production of polyploids. They are administered either by spreading aqueous solutions or suspensions thereof on cultivated soil, or by treating seeds in undiluted form therewith or with solutions of said compounds in a suitable solvent or with dusting powder containing said compounds deposited on a suitable carrier.

The following examples serve to illustrate the present invention without, however, limiting the same thereto. Particularly, many changes and variations in the temperature and the duration of the reaction, in the nature of the reaction components and the order of introducing them into the reaction vessel, in the mode of working up the reaction products and of isolating and purifying the same may be made by those skilled in the art in accordance with the principles set forth herein and in the claims annexed hereto.

The melting points are instantaneous melting points determined on the Maquenne block.

EXAMPLE 1

*Preparation of N-desacetyl-N,N-dimethyl thiocolchicine III*

1 g. of N-desacetyl thiocolchicine are dissolved in 75 cc. of methanol. The solution is stirred at room temperature for 24 hours after adding 10 cc. of methyl iodide and 0.5 g. of sodium carbonate. After filtration, the reaction mixture is evaporated to dryness in a vacuum. The residue is treated with acetic acid anhydride in the presence of pyridine. Thereby, N-desacetyl-N-monomethyl thiocolchicine which has been formed as by-product is acetylated. The reaction mixture is diluted with ice water, extracted with 250 cc. of chloroform, and the extract is washed with 2 N sulfuric acid. N-desacetyl-N,N-dimethyl thiocolchicine is extracted from the chloroform solution by means of 6 N sulfuric acid. After rendering the sulfuric acid extract alkaline, the N,N-dimethyl base compound is extracted by means of chloroform. The solvent is distilled off in a vacuum. The residue is recrystallized from ethyl acetate. 633 mg. (58% of the theoretical amount) of the new compound are obtained. It melts at 169–170° C. with decomposition. It has a specific rotatory power of $$[\alpha]_D^{20} = -150° \pm 5$$

(concentration: 0.5% in chloroform).

Analysis: $C_{22}H_{27}O_4NS = 401.5$
Calculated: 65.8% C; 6.8% H; 15.9% O; 3.5% N; 7.9% S.
Found: 65.9% C; 6.8% H; 16.2% O; 3.5% N; 8.0% S.

This compound is new. It is obtained in the form of small orange crystals, which are soluble in alcohol, ether, acetone, benzene, and chloroform, and insoluble in water.

EXAMPLE 2

*Preparation of the iodo methylate of N-desacetyl-N,N-dimethyl thiocolchicine IV*

4 g. of N-desacetyl-N,N-dimethyl thiocolchicine obtained according to the foregoing example are dissolved in 10 cc. of methyl iodide. After standing for 5 days at room temperature, the resulting crystals are filtered. 4.760 g. (87% of the theoretical amount) of the iodo methylate are obtained. The compound melts at 201–203° C. with decomposition.

Analysis: $C_{23}H_{30}O_4NSI = 543.5$
Calculated: 50.8% C; 5.6% H; 23.4% I
Found: 50.6% C; 5.5% H; 22.6% I This compound has not yet been described in the literature. It forms small yellow crystals which are insoluble in water and ether and very slightly soluble in alcohol and chloroform.

EXAMPLE 3

*Preparation of the methyl ester of 12,13,14-trimethoxy-9-methyl thio-4,5-6,7-dibenzo-cycloheptadiene - 8 - carboxylic acid V*

1 g. of the iodo methylate obtained according to the foregoing example is dissolved in 100 cc. of methanol which contains 8 cc. of water. 2.5 g. of freshly prepared silver oxide are added. Formation of gaseous trimethylamine starts at once. The reaction is completed by stirring the mixture at 40° C. for 4 hours. After filtration, the solution is concentrated by evaporation in a vacuum. The residue is recrystallized from methanol. After treating the hot solution with charcoal and filtration, 275 mg. (39% of the theoretical amount) of fine colorless needles are obtained on cooling. The compound melts at 159–160° C. and has a specific rotatory power of $[\alpha]_D^{20} = 0°$ (concentration: 0.5% in chloroform).

This compound is new. It is insoluble in water, slightly soluble in ether and soluble in alcohol, acetone, benzene, and chloroform.

Analysis: $C_{21}H_{24}O_5S = 388.5$
Calculated: 64.9% C; 6.2% H; 20.6% O; 8.25% S
Found: 64.7% C; 6.1% H; 20.8% O; 8.1% S

EXAMPLE 4

*Preparation of the methyl ester of 12,13,14-trimethoxy-4,5-6,7-dibenzo cycloheptadiene-8-carboxylic acid VI*

100 mg. of the methyl thio compound obtained according to the foregoing example are dissolved in 25 cc. of ethyl acetate. 2 cc. of a suspension of Raney nickel which has previously been washed with water, in ethyl acetate are added. Hydrogenation is effected; thereby, the methyl thio group is split off. The reaction mixture is filtered by means of a filter aid (hypercel) and the filtrate is evaporated to dryness. The residue crystallizes on trituration with ether. 66 mg. (75% of the theoretical yield) of the new compound are obtained. It melts at 152° C. and has a specific rotatory power of $[\alpha]_D^{20} = 0°$ (concentration: 0.5% in chloroform).

This product which has not yet been described crystallizes in the form of small colorless needles which are insoluble in water, slightly soluble in ether, and soluble in alcohol, acetone, benzene, and chloroform.

Analysis: $C_{20}H_{22}O_5 = 342.4$
Calculated: 70.2% C; 6.5% H
Found: 70.0% C; 6.5% H

EXAMPLE 5

*Preparation of 12, 13, 14-trimethoxy-4,5-6,7-dibenzo cycloheptadiene-8-carboxylic acid VII*

125 g. of the methyl ester compound obtained according to Example 4 are saponified by refluxing said compound in an aqueous sodium hydroxide solution which contains 50% of alcohol. The reaction mixture is acidified and extracted with chloroform. An oil is obtained which crystallizes on trituration with ether. 75 mg. (65% of the theoretical amount) of the carboxylic acid compound are obtained. The acid melts at 184° C. and has a specific rotatory power of $[\alpha]_D^{20} = 0°$ (concentration: 0.5% in chloroform).

U.V. spectrum (in ethanol) = $\lambda_{inf.} = 245$ m$\mu$ ($\epsilon = 15,800$).

Infrared spectrum (in paraffin oil "Nujol") = $\gamma$ ($c=0$) acid 1728 cm.$^{-1}$.

Analysis: $C_{19}H_{20}O_5 = 328.4$
Calculated: 69.5% C; 6.1% H.
Found: 69.4% C; 6.25% H.

The compound is new. It crystallizes in the form of small transparent needles which are insoluble in water, slightly soluble in ether, and soluble in alcohol and chloroform.

The compounds described in Examples 1 and 2 are useful intermediates in the synthesis of the valuable dibenzo cycloheptadiene compounds according to the present invention.

Said intermediates as well as the new dibenzo cycloheptadiene compounds according to the present invention are used, for instance, in agriculture in the form of their solutions in suitable solvents or in mixtures with suitable solid carrier materials. Concentrations between 0.1% and 2% have proved to be of great value in the treatment of seeds to produce polyploidism without, however, being limited to such concentrations. Cultivated soil may also be sprayed with such solutions.

We claim:
1. The methyl ester of 12,13,14-trimethoxy-9-methyl thio-4,5-6,7-dibenzo cycloheptadiene-8-carboxylic acid.
2. The methyl ester of 12,13,14-trimethoxy-4,5-6,7-dibenzo cycloheptadiene-8-carboxylic acid.
3. 12,13,14-trimethoxy-4,5-6,7-dibenzo cycloheptadiene-8-carboxylic acid.
4. The iodo methylate of N-desacetyl-N,N-dimethyl thiocolchicine.
5. In a process of preparing the 12,13,14-trimethoxy-4,5-6,7-dibenzo cycloheptadiene-8-carboxylic acid the steps comprising subjecting N-desacetyl thiocolchicine to the action of methyl iodide, separating the resulting N-desacetyl-N,N-dimethyl thiocolchicine from the corresponding N-monomethyl compound formed in the reaction as by-product, by subjecting the reaction product to the action of an acetylating agent and extracting the resulting acetylation mixture by means of a dilute mineral acid, subjecting the resulting N-desacetyl-N,N-dimethyl thiocolchicine to the action of methyl iodide, reacting the resulting quaternary ammonium salt with silver oxide, splitting off the 9-methyl thio group from the resulting methyl ester of 12,13,14-trimethoxy-9-methyl thio-4,5-6,7-dibenzo cycloheptadiene-8-carboxylic acid by hydrogenation in ethyl acetate in the presence of Raney nickel, and saponifying the resulting compound by means of a dilute alcoholic solution of a basic compound.

6. The process according to claim 5, wherein methylation of N-desacetyl thiocolchicine is carried out in a methanol solution at about room temperature in the presence of sodium carbonate, acetylation of N-desacetyl-N-monomethyl thiocolchicine formed as by-product in the methylation reaction is carried out by means of acetic acid anhydride in the presence of pyridine, and the mineral acid used for extracting N-desacetyl-N,N-dimethyl thiocolchicine is 6 N sulfuric acid.

7. The process according to claim 5, wherein saponification of the methyl ester of 12,13,14-trimethoxy-4,5-6,7-dibenzo cycloheptadiene-8-carboxylic acid is carried out by refluxing said compound in an aqueous sodium hydroxide solution containing 50% of alcohol.

8. In a process of preparing the methyl ester of the 12,13,14-trimethoxy-9-methyl thio-4,5-6,7-dibenzo cycloheptadiene-8-carboxylic acid the steps comprising subjecting N-desacetyl thiocolchicine to the action of methyl iodide, separating the resulting N-desacetyl-N,N-dimethyl thiocolchicine from the corresponding N-monomethyl compound formed in the reaction as by-product, by subjecting the crude reaction product to the action of an acetylating agent and extracting the resulting acetylation mixture by means of a dilute mineral acid, subjecting the resulting N-desacetyl-N,N-dimethyl thiocolchicine to the action of methyl iodide and reacting the resulting quaternary ammonium salt with silver oxide.

9. In the process according to claim 8, wherein methylation of N-desacetyl thiocolchicine is carried out in a methanol solution at about room temperature in the presence of sodium carbonate, acetylation of N-desacetyl-N-monomethyl thiocolchicine formed as by-product in the methylation reaction is carried out by means of acetic acid anhydride in the presence of pyridine, and the mineral acid used for extracting N-desacetyl-N,N-dimethyl thiocolchicine is 6 N sulfuric acid.

References Cited in the file of this patent

Hickinbottom: "Reactions of Organic Compounds," pages 299, 304 (1948).

Velluz et al.: Bull. Soc. Chim. (France), 21, 755, 757, (1954); 22, 194, 197 (1955).